United States Patent
Tang

(10) Patent No.: US 7,538,958 B2
(45) Date of Patent: May 26, 2009

(54) WIDE-ANGLE LENS

(75) Inventor: Nai-yuan Tang, Tantz Shiang (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/961,180

(22) Filed: Dec. 20, 2007

(65) Prior Publication Data

US 2008/0158695 A1    Jul. 3, 2008

(30) Foreign Application Priority Data

Dec. 29, 2006    (TW) .............................. 95149837 A

(51) Int. Cl.
   *G02B 9/34*    (2006.01)
   *G02B 9/60*    (2006.01)
(52) U.S. Cl. .................. 359/783; 359/770; 359/781
(58) Field of Classification Search ............... 359/770, 359/781, 783, 682, 686, 753
   See application file for complete search history.

(56) References Cited

U.S. PATENT DOCUMENTS

| | | | | |
|---|---|---|---|---|
| 6,088,169 | A | * | 7/2000 | Ohno ..................... 359/682 |
| 6,825,993 | B2 | | 11/2004 | Noda |
| 6,982,834 | B2 | | 1/2006 | Sato |

* cited by examiner

*Primary Examiner*—William C Choi
*Assistant Examiner*—Jack Dinh

(57) ABSTRACT

A wide-angle lens includes, in order from the object side to the image side, a first lens element of negative refractive power, a second lens element of positive refractive power, a third lens element of positive refractive power and a cemented doublet element of positive refractive power consisting of a fourth lens element and a fifth lens element cemented together. The combined focal length of the second, third, fourth and fifth lens elements satisfies one specified condition, which allows the wide-angle lens to be effectively shortened and makes the construction thereof compact.

11 Claims, 6 Drawing Sheets

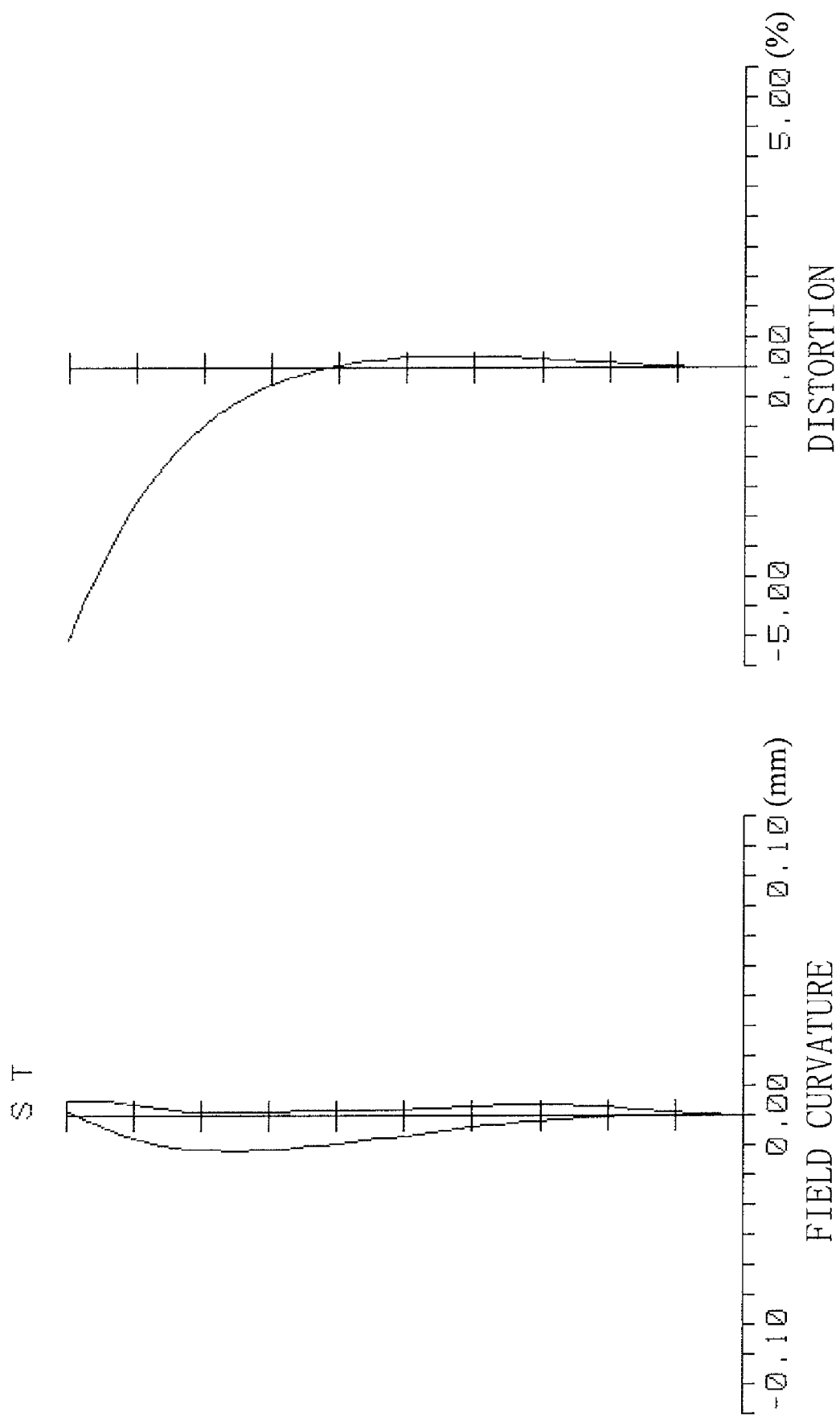

TRANSVERSE RAY FAN PLOTS

WIDE-ANGLE LENS

BACKGROUND OF THE INVENTION

1. Field of the Invention

The present invention relates to a lens, and in particular to a wide-angle lens, of which the overall length is shortened for use in an imaging device.

2. Description of Prior Art

Lenses for imaging devices, such as video cameras and digital cameras, are classified by the focal length as standard lenses, wide-angle lenses and telephoto lenses. Generally, the wide-angle lens is a short zoom lens, both an angle of view and a shoot scope of which become larger with decreasing of the lens focal length. The wide-angle lens can be used to photograph a larger scene or a whole scene in a limited distance. For example, a video camera adopting the wide-angle lens is adapted for use in network video and photographs all the scenes located at a user's end, thereby realizing the real-time network communication.

As an image pick-up device, conventional optical spherical lenses have been widely adopted in optical industry field because of easy machining. However, the spherical lenses have the disadvantages of uneasy correction of spherical aberration and astigmatic aberration. To improve the above-mentioned drawbacks existing in the conventional spherical lenses, aspheric lenses have been used to obtain better image quality.

U.S. Pat. No. 6,982,834 B2 discloses a wide-angle zoom lens including at least one aspheric lens surface. This conventional wide-angle zoom lens includes a first lens group having a negative refractive power, a second lens group having a positive refractive power and a third lens group having a positive refractive power. The conventional wide-angle zoom lens includes at least one aspheric lens surface. When a difference value between the Abbe numbers of the first and second lens groups is larger than 20.5 and a half angle of view of the zoom lens is located between 36.0 and 41.0, the zoom lens can obtain better image quality.

U.S. Pat. No. 6,825,993 B2 discloses a wide-angle lens having aspheric surface. This conventional wide-angle lens includes, in order from the object side, a negative first plastic lens element, a positive second plastic lens element, a positive cemented doublet element and a positive lens element. All lens elements of the wide-angle lens except the cemented doublet element have an aspheric surface. When a ratio of the distance between the first plastic lens and the second plastic lens to the focal length of the wide-angle lens is 0.5 to 1.0, the wide-angle lens can obtain better image quality.

It is known that any wide-angle lens can improve the optical aberration not only by adopting the aspheric surface and the cemented doublet element, but also by satisfying specified conditions.

With developing of image devices and network video, there is a great demand for wide-angle lenses. Conventional wide-angle lenses as mentioned above can not satisfy the new requirement of image devices having new performances. Accordingly, how to reduce the size and weight of the whole lens system while maintaining high optical performance is a problem encountered by a lens designer.

SUMMARY OF THE INVENTION

Accordingly, an object of the present invention is to provide a wide-angle lens having a larger F number, an angle of view as large as approximately 80 degrees and a short overall length, all these enabling a compact construction of lens to be produced.

To achieve the above object of the present invention, a wide-angle lens in accordance with the present invention comprises, in order from an object side to an image side, a first lens element of negative refractive power, a second lens element of positive refractive power, a third lens element of positive refractive power and a cemented doublet element of positive refractive power consisting of a fourth lens element and a fifth lens element cemented together. The first lens element has an object-side aspheric surface. The second and third lens elements both have at least one aspheric surface. The second, third, fourth and fifth lens elements satisfy the following condition:

$$0.7 < f2345/f < 1.0$$

where f2345 represents the combined focal length of the second, third, fourth and fifth lens elements and f represents the total focal length of the wide-angle lens.

In accordance with the present invention, the wide-angle lens further satisfies the following condition:

$$X - X' \geq 0$$

where X represents the horizontal distance between an arbitrary point sitting at an off-optical-axis position with respect to the object-side surface of the wide-angle lens and a corresponding on-optical-axis point sitting on the object-side surface of the first lens element, and X' represents the horizontal distance between the arbitrary point sitting at the off-optical-axis position with respect to a reference spherical surface associated with the object-side aspheric surface of the wide-angle lens and a corresponding on-optical-axis point sitting on the reference spherical surface of the object-side aspheric surface of the first lens element.

The aspheric surfaces of the aspheric lenses employed in the wide-angle lens are expressed by the following formula:

$$z = \frac{h^2/r}{1 + \sqrt{1-(k+1)h^2/r^2}} + Ah^4 + Bh^6 + Ch^8 + Dh^{10} + Eh^{12} + Fh^{14} + Gh^{16}$$

where z represents displacement in the direction of the optical axis at the position of height h from the optical axis relative to the surface vertex; r is the curvature radius of the aspheric lens surface on the optical axis; h represents height of a point on the aspheric surface with respect to the optical axis; k represents a cone constant; and A, B, C, D, E, F and G are aspheric coefficients for the fourth, sixth, eighth, tenth, twelfth, fourteenth and sixteenth orders.

In comparison with the prior art, the wide-angle lens of the present invention has characteristics of a larger F number and a large angle of view, which is as large as approximately 80 degrees. The wide-angle lens of the present invention comprises constituent lens elements that have aspheric surfaces, and the combined focal length of the second, third, fourth and fifth lens elements of the wide-angle lens satisfies the previously listed condition. As a consequence of these, the overall length of the wide-angle lens can be effectively shortened and the construction thereof becomes compact. Moreover, because the object-side surface and its reference spherical surface of the first lens element satisfy another specified condition, the optical performance of the wide-angle lens can be further improved.

BRIEF DESCRIPTION OF THE DRAWINGS

The present invention may best be understood through the following description with reference to the accompanying drawings, in which:

FIGS. 2A-2E respectively show longitudinal aberration, field curvature, distortion, transverse ray fan plots and MTF curves of one Numerical Embodiment of a wide-angle lens according to the present invention.

DETAILED DESCRIPTION OF THE PREFERRED EMBODIMENT

Figure 1:
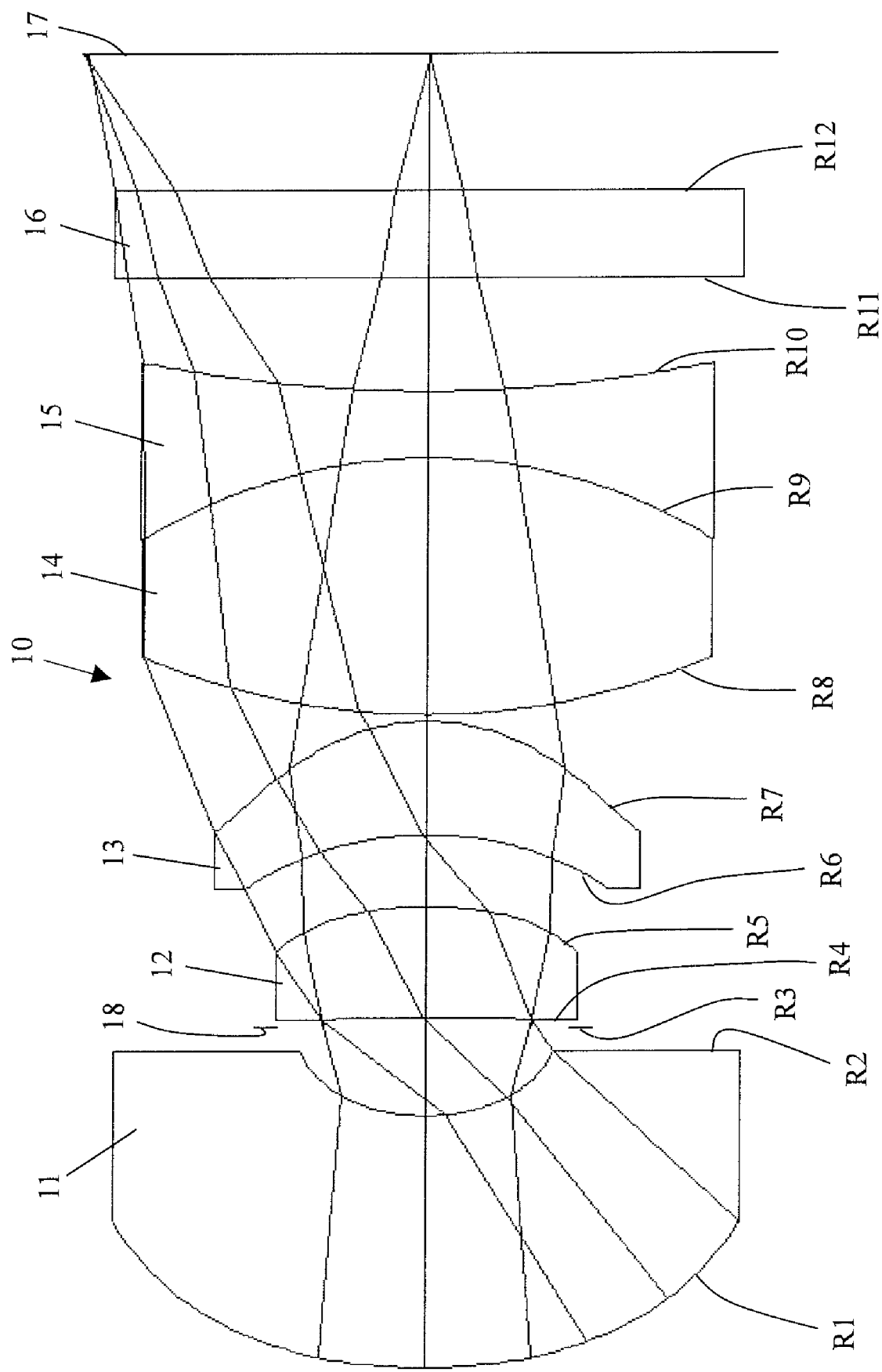
FIG. 1 schematically shows the construction of a wide-angle lens according to the present invention.
Figure 2A:
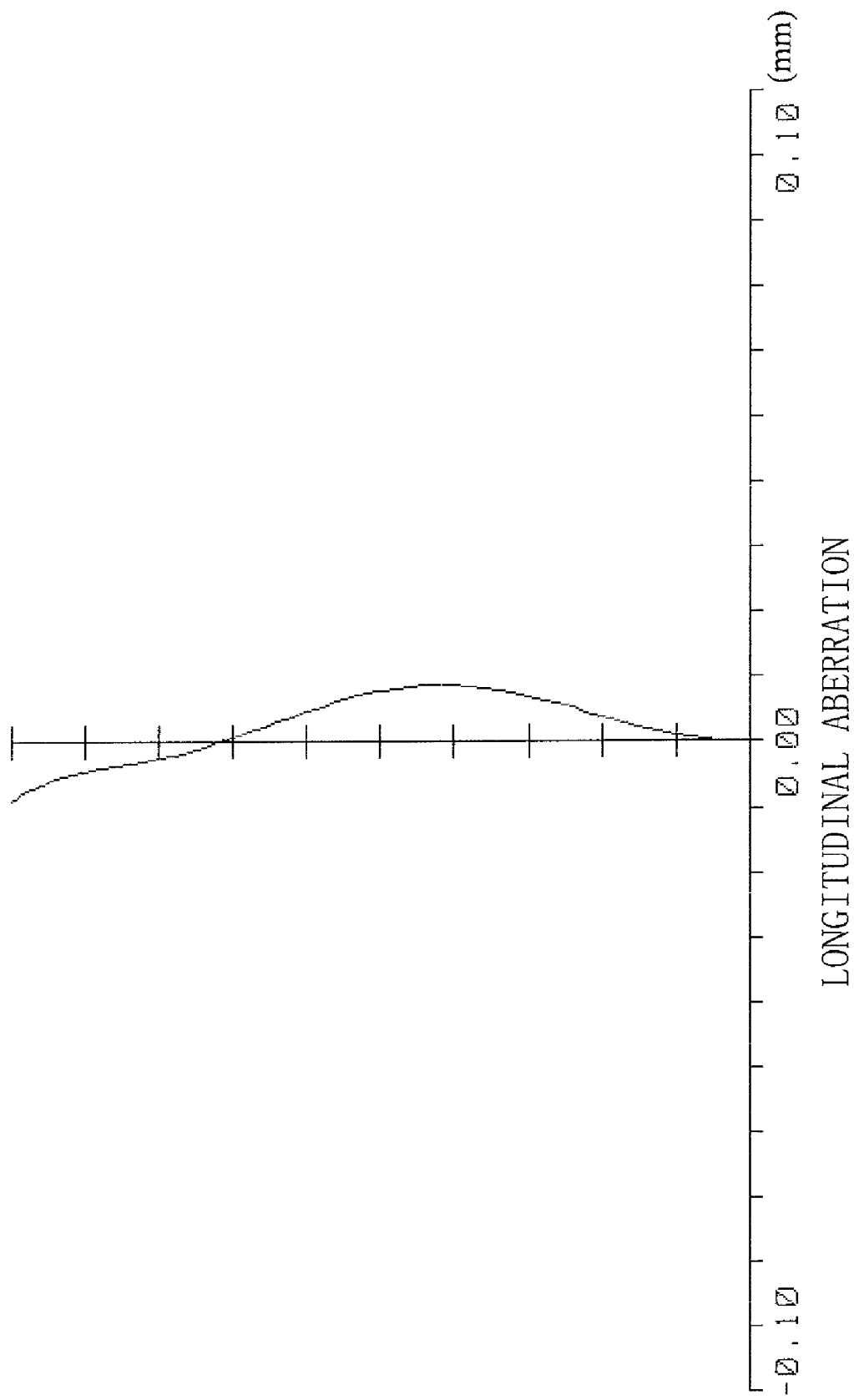
Figure 2D:
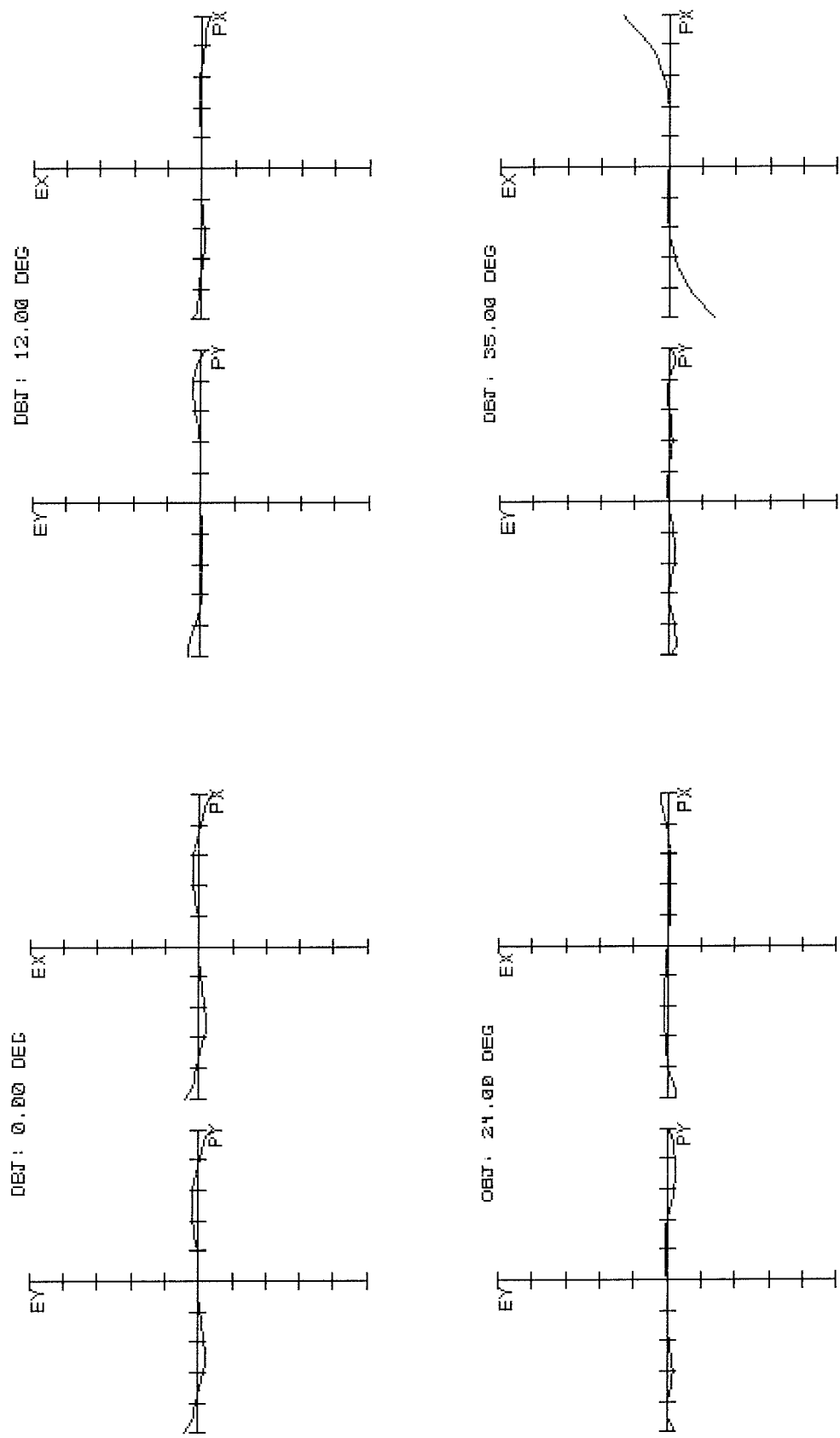
Figure 2E:
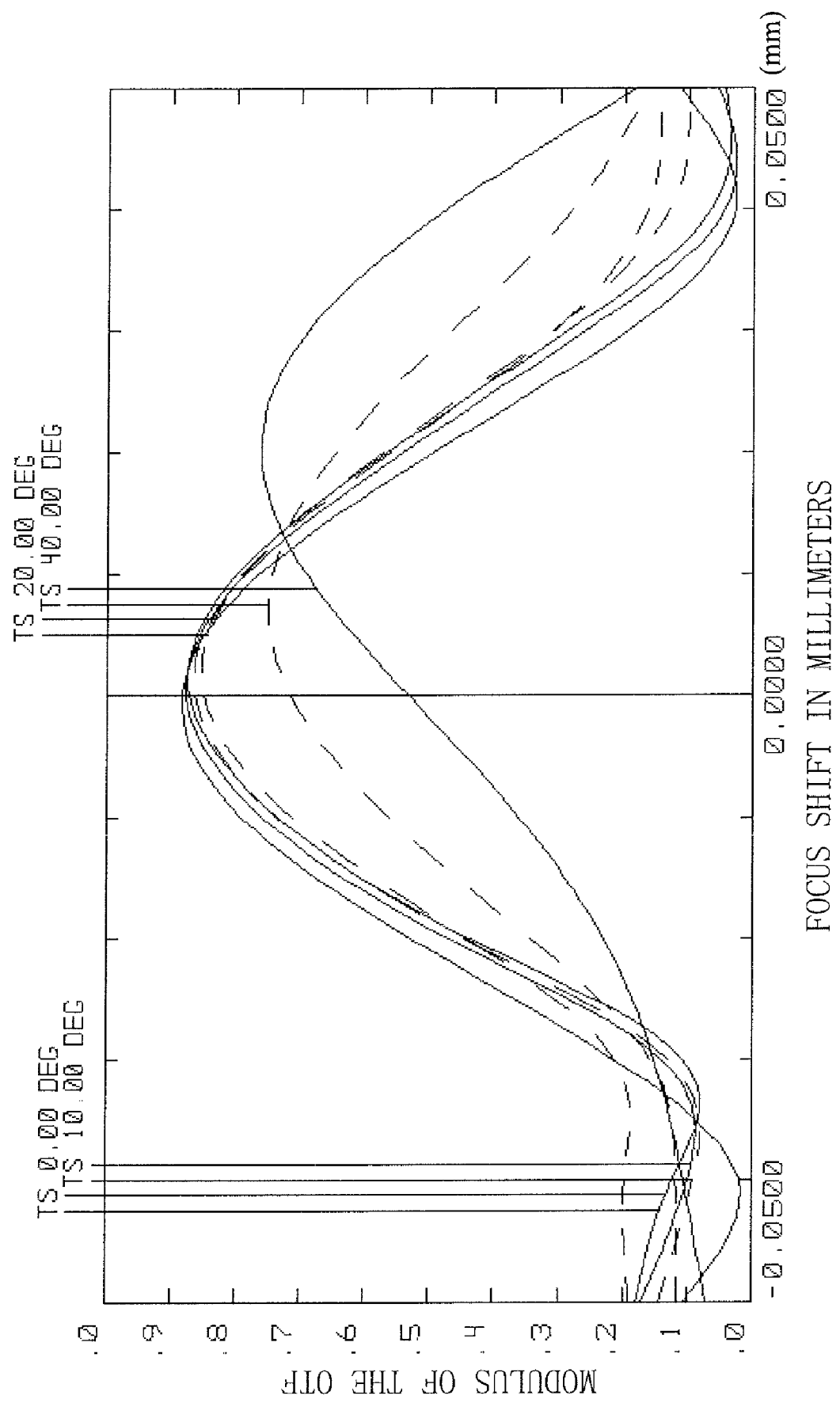

With reference to the drawings and in particular to FIG. 1, a wide-angle lens 10 constructed in accordance with the present invention comprises, in order from an object side to an image side, a first lens element 11 of relatively high refractive index and having a negative refractive power, a second lens element 12 having a positive refractive power, a third lens element 13 having positive refractive power, and a cemented doublet element of positive refractive power consisting of a fourth lens element 14 and a fifth lens element 15 cemented together. An incident light from an object to be imaged transmits in sequence through the first, second, third, fourth and five lens elements 11-15 and is focused onto an image pickup device (image plane) 17, such as a CCD (Charge-Coupled Device) sensor or CMOS (Complimentary Metal-Oxide Semiconductor) sensor to obtain a clear image.

The wide-angle lens 10 further comprises a glass cover 16 disposed between the fifth lens element 15 and the image plane 17 and an aperture 18 disposed between the first lens element 11 and the second element 12. If desired, the glass cover 16 can be removed.

The first lens element 11 has an object-side convex surface R1 for converging the light of a wide-angle scene and an image-side concave surface R2. The object-side convex surface R1 is an aspheric surface to provide enhanced suppression of distortion of image and to improve the clarity of the image.

The second lens element 12 is a meniscus lens having an object-side concave surface R4 and an image-side convex surface R5. At least one of the surfaces R4, R5 is made aspheric. The second lens element 12 is used to compensate lens aberration.

The third lens element 13 is also a meniscus lens having an object-side concave surface R6 and an image-side convex surface R7. At least one of the surfaces R6, R7 is made aspheric. The third lens element 13 is primarily for improving the focusing power of the wide-angle lens 10 and thus shortening the overall length.

The fourth lens element 14 and the fifth lens element 15 are cemented together, forming a doublet lens element. The cemented doublet element has an object-side convex surface R8, a middle surface R9 and an image-side concave surface R10. The cemented doublet element helps correcting chromatic aberration and reducing the loss of light.

The glass cover 16 has two planar surfaces R11, R12 and, if properly coated, serves to filter out ultra-violet light rays of undesirable specific frequencies and provides resistance against undesired reflection. Of course, the glass cover 16 can be of other functions that can be realized by proper coating on the surfaces thereof.

In accordance with the present invention, each of the first, second and third lens elements 11, 12, 13 has at least one aspheric surface for improving the image quality, shortening the overall length and reducing the size and weight of the wide-angle lens 10. In a preferred embodiment, all the surfaces R1, R2, R4, R5, R6, R7 of the first, second and third lens elements 11, 12, 13 are made aspheric for optimum aberration correction.

The wide-angle lens 10 satisfies the following condition:

$$0.7 < f2345/f < 1.0 \tag{1}$$

where f2345 represents the combined focal length of the second, third, fourth and fifth lens elements 12, 13, 14, 15 and f represents the total focal length of the wide-angle lens 10.

If the ratio of f2345 to f exceeds the upper limit specified condition (1), the whole focusing power of all lens elements 12, 13, 14, 15 disposed at an image side of the aperture 18 becomes weak and the overall length of the wide-angle lens 10 becomes too long. If the ratio is smaller than the lower limit of condition (1), then the distance between adjacent lens elements disposed at the image side of the aperture 18 becomes very short. That is, the wide-angle lens 10 is very difficult to be manufactured because of the excessively compact arrangement of the lens elements.

Figure 3:
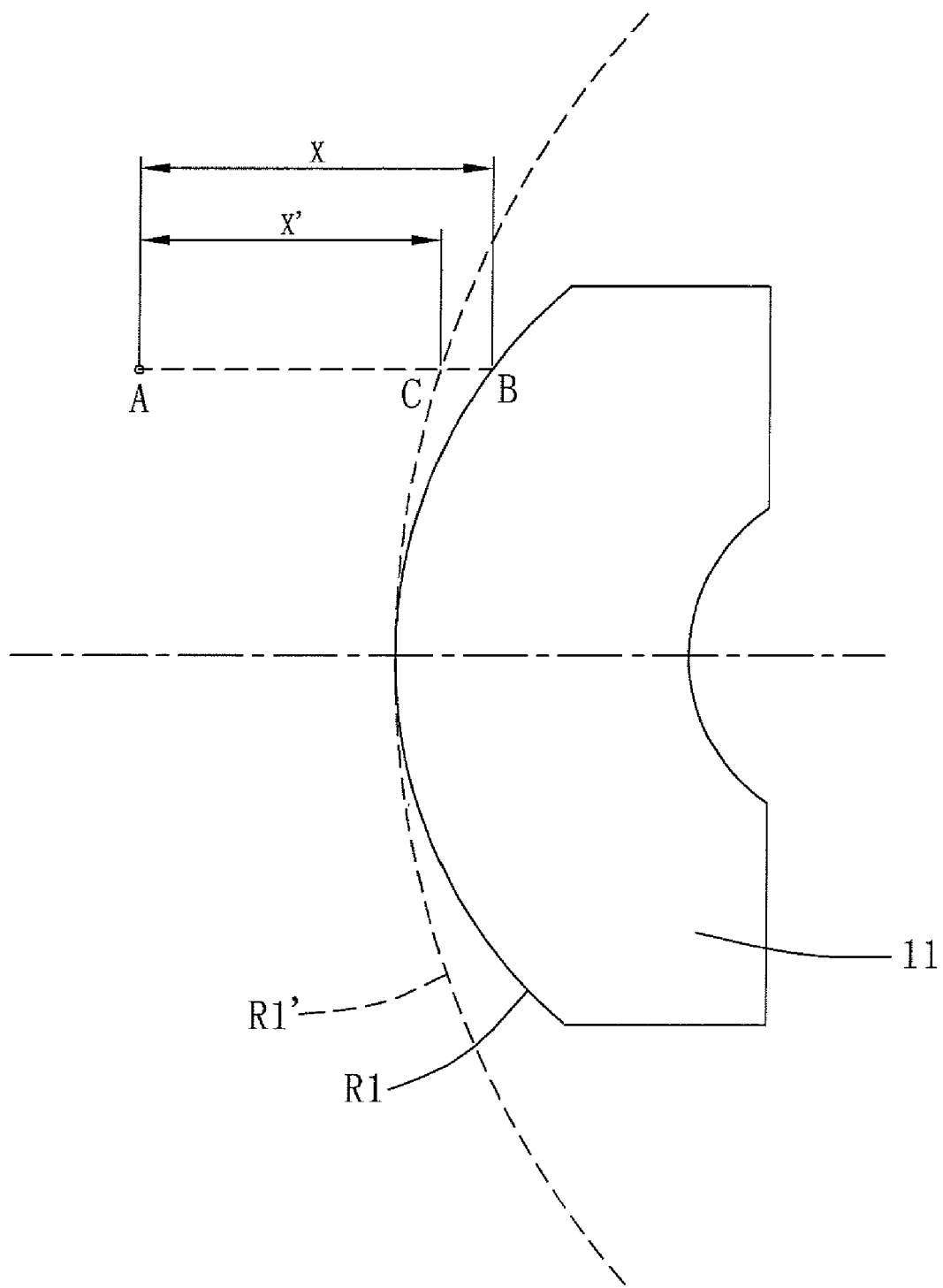
FIG 3 schematically shows a relative relationship between an object-side aspheric surface of a first lens element of the present invention and reference spherical surface thereof.

Referring to FIG. 3, it is schematically shows a relative relationship between the object-side aspheric surface R1 of the first lens element 11 of the present invention and a reference spherical surface R1' thereof. In order to further optimizing the optical performance, the wide-angle lens 10 also satisfies the following condition:

$$X - X' \geqq 0 \tag{2}$$

where X represents the horizontal distance between an arbitrary point A sitting at an off-optical-axis position with respect to the object-side surface R1 of the wide-angle lens 10 and a corresponding on-optical-axis point B sitting on the object-side R1 of the first lens element 11, and X' represents the horizontal distance between the abitrary point A sitting at the off-optical-axis position of the wide-angle lens 10 and an on-optical-axis point C sitting on a reference spherical surface R1' of the subject-side surface R1 of the first lens element 11.

If the difference between X and X' is less than the lower limit specified in condition (2) (that is zero in this case), the coma aberration of the off-optical-axis field of view becomes large and the resolution of the wide-angle lens 10 is reduced.

To correct aberrations, the lens elements of the wide-angle lens 10 employs aspheric surface and in accordance with the present invention, each of the first, second and third lens elements 11, 12, 13 has at least one aspheric surface. The aspheric surfaces is defined by the formula:

$$z = \frac{h^2/r}{1 + \sqrt{1 - (k+1)h^2/r^2}} + Ah^4 + Bh^6 + Ch^8 + Dh^{10} + Eh^{12} + Fh^{14} + Gh^{16}$$

where z represents displacement in the direction of the optical axis at the position of height h from the optical axis relative to the surface vertex; r is the curvature radius of the aspheric lens surface on the optical axis, h represents height of a point on the aspheric surface with respect to the optical axis; k represents a cone constant; and A, B, C, D, E, F and G are aspheric coefficients for the fourth, sixth, eighth, tenth, twelfth, fourteenth and sixteenth orders.

The present invention will be more fully understood by the description of the following Numerical Embodiment. According to the Numerical Embodiment of the present invention, the F number of the wide-angle lens 10 is 2.0, the angle of view of the wide-angle lens 10 is 80 degree, and the ratio of f2345 to f is 0.75.

According to the above Numerical Embodiment of the wide-angle lens 10, as shown in FIG. 1, surfaces R1, R2, R4, R5, R6, R7 of the first, second and third lens elements 11, 12, 13 are all configured to be aspheric surfaces. That is, each of the first, second and third lens elements 11, 12, 13 has two aspheric surfaces. Aspheric coefficients for these aspheric surfaces are illustrated below:

|  | k | A | B | C | D | E | F | G |
|---|---|---|---|---|---|---|---|---|
| R1 | −2.578748 | 0.54306468 | −0.55482856 | 2.1919249 | −3.3816862 | 3.0254245 | 0 | 0 |
| R2 | −0.5499776 | 4.7719915 | −52.422451 | 2169.7158 | −28680.449 | 174871.8 | 0 | 0 |
| R4 | 98.04498 | −0.32789398 | −10.977896 | 224.24265 | −3150.4247 | 9451.991 | 0.0029638144 | 0.005153884 |
| R5 | 4.024102 | −0.32557687 | −11.935386 | 116.969 | −711.69287 | −15.492567 | 0 | 0 |
| R6 | −5.786167 | −1.6319177 | 2.5844135 | −22.390029 | 286.27457 | −1036.3254 | 0 | 0 |
| R7 | −0.4109825 | 0.094935206 | −1.1833431 | 30.324863 | −195.51807 | 587.07482 | 1556.1925 | −6744.0074 |

In Data Table 1 given below according to the Numerical Embodiment, the symbol "i" represents the order of the surface numbering from the object side (including lens surfaces, the aperture 18 and the glass cover 17), "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member. Thus, in the following table, surface numbers 1 and 2 are surfaces of the first lens element 11, surface numbers 4 and 5 are surfaces of the second lens element 12, surface numbers 6 and 7 are surfaces of the third lens element 13, surface numbers 8, 9, and 10 are surfaces of the cemented fourth and fifth lens elements 14 and 15, and surface numbers 11 and 12 are surface of the glass cover 16.

DATA TABLE 1

| Surface (i) | Ri (mm) | D (mm) | Nd | Vd |
|---|---|---|---|---|
| 1 | 1.353 | 0.584 | 1.632 | 23.43 |
| 2 | 0.482 | 0.222 | | |
| 3 (aperture) | ∞ | 0.005 | | |
| 4 | −14.215 | 0.259 | 1.53 | 56 |
| 5 | −0.908 | 0.165 | | |
| 6 | −0.852 | 0.264 | 1.53 | 56 |
| 7 | −0.487 | 0.016 | | |
| 8 | 1.678 | 0.597 | 1.816 | 46.6 |
| 9 | −1.238 | 0.155 | 1.847 | 23.8 |
| 10 | 3.307 | 0.259 | | |
| 11 | ∞ | 0.207 | 1.516 | 64.15 |
| 12 | ∞ | 0.244 | | |

In Data Table 2 given below according to the Numerical Embodiment, symbols "F1" to "F5" respectively represent the focal lengths of the first to fifth lens elements, and "F45" represents the combined focal length of the fourth and fifth lens elements.

DATA TABLE 2

| | |
|---|---|
| F number | 2.0 |
| Total Focal Length | 1.0 mm |
| F1 | −1.6 mm |
| F2 | 3.72 mm |
| F3 | 1.71 mm |
| F4 | 0.96 mm |
| F5 | −1.05 mm |
| F45 | 3.84 mm |

Aberrations of the present wide-angle lens 10 according to the above Numerical Embodiment can be effectively corrected and are respectively shown in FIGS. 2A-2E.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wide-angle lens comprising, in order from an object side to an image side, a first lens element of negative refractive power, a second lens element of positive refractive power, a third lens element of positive refractive power and a cemented doublet element of positive refractive power consisting of a fourth lens element and a fifth lens element joined together, the first lens element having an object-side aspheric surface, the second lens element being of a meniscus lens and having an object-side concave surface and an image-side convex surface at least one of which is an aspheric surface, the third lens element being of a meniscus lens and having an object-side concave surface and an image-side convex surface at least one of which is an aspheric surface, wherein the second, third, fourth and fifth lens elements satisfy the following condition:

$$0.7 < f2345/f < 1.0$$

where f2345 represents a combined focal length of the second, third, fourth and fifth lens elements and f represents a total focal length of the wide-angle lens.

2. The wide-angle lens as claimed in claim 1, wherein the object-side aspheric surface of the first lens element satisfies the following condition:

$$X - X' \geq 0$$

where X represents a horizontal distance between an arbitrary point sitting at an off-optical-axis position with respect to the object side aspheric surface of the first lens element and a corresponding on-optical-axis point sitting on the object-side surface of the first lens element, and X' represents a horizontal distance between the arbitrary point sitting at the off-optical-axis position of the first lens element and a corresponding on-optical-axis point sitting on a reference spherical surface of the object-side aspheric surface of the first lens lens element.

3. The wide-angle lens as claimed in claim 1, wherein the first lens element has a high refractive power and the object-side aspheric surface of the first lens element is convex toward the object side.

4. The wide-angle lens as claimed in claim 1, wherein the second lens element has two aspheric surfaces.

5. The wide-angle lens as claimed in claim 1, wherein the third lens elements has two aspheric surfaces.

6. The wide-angle lens as claimed in claim 1 further comprising an aperture disposed between the first lens element and the second element.

7. The wide-angle lens as claimed in claim 1 further comprising a glass cover disposed between the fifth lens element and the image side.

8. A wide-angle lens comprising, in order from an object side to an image side, a first lens element of negative refractive power, a second lens element of positive refractive power, a third lens element of positive refractive power and a cemented doublet element of positive refractive power consisting of a fourth lens element and a fifth lens element joined together, the first lens element having an object-side aspheric surface, the second and third lens elements both having at least one aspheric surface, wherein the second, third, fourth and fifth lens elements satisfy the following condition:

$$0.7 < f2345/f < 1.0$$

where f2345 represents a combined focal length of the second, third, fourth and fifth lens elements and f represents a total focal length of the wide-angle lens, and wherein the object-side aspheric surface of the first lens element satisfies the following condition:

$$X - X' \geqq 0$$

where X represents a horizontal distance between an arbitrary point sitting at an off-optical-axis position with respect to the object side aspheric surface of the first lens element and a corresponding on-optical-axis point sitting on the object-side surface of the first lens element, and X' represents a horizontal distance between the arbitrary point sitting at the off-optical-axis position of the first lens element and a corresponding on-optical-axis point sitting on a reference spherical surface of the object-side aspheric surface of the first lens element.

9. The wide-angle lens as claimed in claim 8, wherein the first, second, and third lens elements are aspheric lenses each having two aspheric surfaces.

10. The wide-angle lens as claimed in claim 8 further comprising an aperture disposed between the first lens element and the second element.

11. The wide-angle lens as claimed in claim 8 further comprising a glass cover disposed between the fifth lens element and the image side.

* * * * *